United States Patent
Zhang et al.

(10) Patent No.: US 8,068,676 B2
(45) Date of Patent: Nov. 29, 2011

(54) INTELLIGENT FASHION EXPLORATION BASED ON CLOTHES RECOGNITION

(75) Inventors: Wei Zhang, Palo Alto, CA (US); Juan J. Liu, Milpitas, CA (US); Maurice K. Chu, San Mateo, CA (US); James M. A. Begole, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1034 days.

(21) Appl. No.: 11/983,096

(22) Filed: Nov. 7, 2007

(65) Prior Publication Data

US 2009/0116698 A1    May 7, 2009

(51) Int. Cl.
*G06K 9/62* (2006.01)

(52) U.S. Cl. ........ 382/224; 382/111; 382/173; 382/181; 382/190; 705/26.1; 705/26.61; 705/26.62; 705/26.64; 705/26.7

(58) Field of Classification Search .................. None
See application file for complete search history.

(56) References Cited

U.S. PATENT DOCUMENTS

| | | | | |
|---|---|---|---|---|
| 5,313,267 A | * | 5/1994 | MacFarlane et al. | ......... 356/405 |
| 6,525,663 B2 | * | 2/2003 | Colmenarez et al. | ...... 340/573.1 |
| 6,882,897 B1 | * | 4/2005 | Fernandez | .................. 700/132 |
| 2008/0082426 A1 | * | 4/2008 | Gokturk et al. | ................. 705/27 |
| 2008/0126962 A1 | * | 5/2008 | Cook | ............................. 715/764 |
| 2008/0144943 A1 | * | 6/2008 | Gokturk et al. | ............... 382/224 |
| 2008/0152231 A1 | * | 6/2008 | Gokturk et al. | ............... 382/209 |
| 2008/0177640 A1 | * | 7/2008 | Gokturk et al. | ................. 705/27 |
| 2008/0212899 A1 | * | 9/2008 | Gokturk et al. | ............... 382/305 |

OTHER PUBLICATIONS

Liu et al., Smart Shopper: An Agent-Based Web-Mining Approach to Internet Shopping, Apr. 2003, IEEE, vol. 11, No. 2, pp. 226-237.*

* cited by examiner

*Primary Examiner* — Sath V Perungavoor
*Assistant Examiner* — Jason Heidemann
(74) *Attorney, Agent, or Firm* — Shun Yao; Park, Vaughan, Fleming & Dowler LLP

(57) ABSTRACT

One embodiment of the present invention provides a system for recognizing and classifying clothes. During operation, the system captures at least one image of a clothing item. The system further determines a region on the captured image which corresponds to a torso and/or limbs. The system also determines at least one color composition, texture composition, collar configuration, and sleeve configuration of the clothing item. Additionally, the system classifies the clothing item into at least one category based on the determined color composition, texture composition, collar configuration, and sleeve configuration. The system then produces a result which indicates the classification.

23 Claims, 8 Drawing Sheets
(6 of 8 Drawing Sheet(s) Filed in Color)

INTELLIGENT FASHION EXPLORATION BASED ON CLOTHES RECOGNITION

BACKGROUND

1. Field

The present disclosure relates to vision systems. More specifically, the present disclosure relates to an intelligent fashion exploration system based on clothes recognition.

2. Related Art

Shopping for clothes is a common activity which can be carried out online or in physical stores. A common practice in a physical store is to search the inventory for items of interest, select a few for comparison, and try them on to decide which, if any, to purchase. The shopper examines the clothes according to how well they fit physically, and also how well they fit the image of herself that she wants others to perceive. That is, the shopper not only checks whether a garment fits her body, but also whether it fits her style.

In essence, fashion decisions are driven by a person's goals for self-expression within her social context, which is determined by many complex and subtle factors. A particular article of clothing may present a different aesthetic depending on how it is coordinated with other articles. A particular style may be considered "cool" or "inappropriate" in different occasions and contexts. In addition, a particular item may go "in" and "out" of fashion over time and among different demographic segments.

Online shopping typically involves technologies for direct searching and recommending items related to a garment, using techniques such as collaborative filtering (identifying clusters of people with similar interest) and recommendation based on content similarity (calculating the similarity of various attributes of content). However, these systems have only limited ability to suggest items that a person might find "fashionable" because the sense of fashion is one of "low semanticity" which varies with context and individual perceptions. Such recommendations can be helpful, but often do not capture a person's particular perceptions of "fashion."

SUMMARY

One embodiment of the present invention provides a system for recognizing and classifying clothes. During operation, the system captures at least one image of a clothing item. The clothing item may optionally be worn by a person. The system further determines a region on the captured image which corresponds to a torso and/or limbs. The system also determines at least one color composition, texture composition, collar configuration, and sleeve configuration of the clothing item. The system can further determine placket configuration, pattern complexity, and pattern placement. Additionally, the system classifies the clothing item into at least one category based on the determined color composition, texture composition, collar configuration, and sleeve configuration. The system then produces a result which indicates the classification.

In a variation on this embodiment, the clothing item is worn by a person, and determining the region on the captured image which corresponds to the person's torso and/or limbs involves producing a clean foreground map from the image and applying one or more bounding boxes to the image, wherein a respective bounding box encloses a part of the person's body.

In a variation of this embodiment, determining the color of the clothing item involves generating a color histogram in red, green, and blue channels. The system further compares the color histogram of the clothing item with a previously stored color histogram of another clothing item, thereby facilitating determination of a color match between the two clothing items.

In a variation of this embodiment, the system crops a set of image patches within the torso region of a number of clothing items, represents a respective patch in a multi-dimension vector, and generates a number of eigen patches by applying a principal component analysis (PCA) to the patches corresponding to different clothing items. Furthermore, determining the texture of the clothing item involves projecting a multi-dimension vector which represents a patch for the clothing item to the eigen patches and then building a histogram of the projected vectors associated with the patches for the clothing item. The system then compares the projected-vector histogram for the patches associated with the clothing item with those of different clothing items.

In a variation of this embodiment, determining the collar configuration involves identifying a bounding box which substantially encloses a collar region of the clothing item and applying Harris corner detection to the bounding box for the collar region.

In a variation of this embodiment, the clothing item is worn by a user, and determining the sleeve configuration involves identifying a skin tone of the person's face, comparing the color of the pixels on the image which correspond to the person's arm, and determining the length of the person's exposed arm based on the color comparison.

In a variation of this embodiment, the system determines the number and/or location of buttons of the clothing item, and/or the length and distribution of the placket.

In a variation of this embodiment, the system recognizes one or more logos on the clothing item.

In a variation of this embodiment, the clothing item is worn by a user, and the system analyzes the person's demographic information.

In a further variation, analyzing the person's demographic information involves determining the person's hair color and complexion.

In a variation of this embodiment, the result indicates a match between the clothing item and a previously stored clothing item based on their respective color, pattern, and/or other factors, thereby facilitating recommendation of similar or different clothes.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
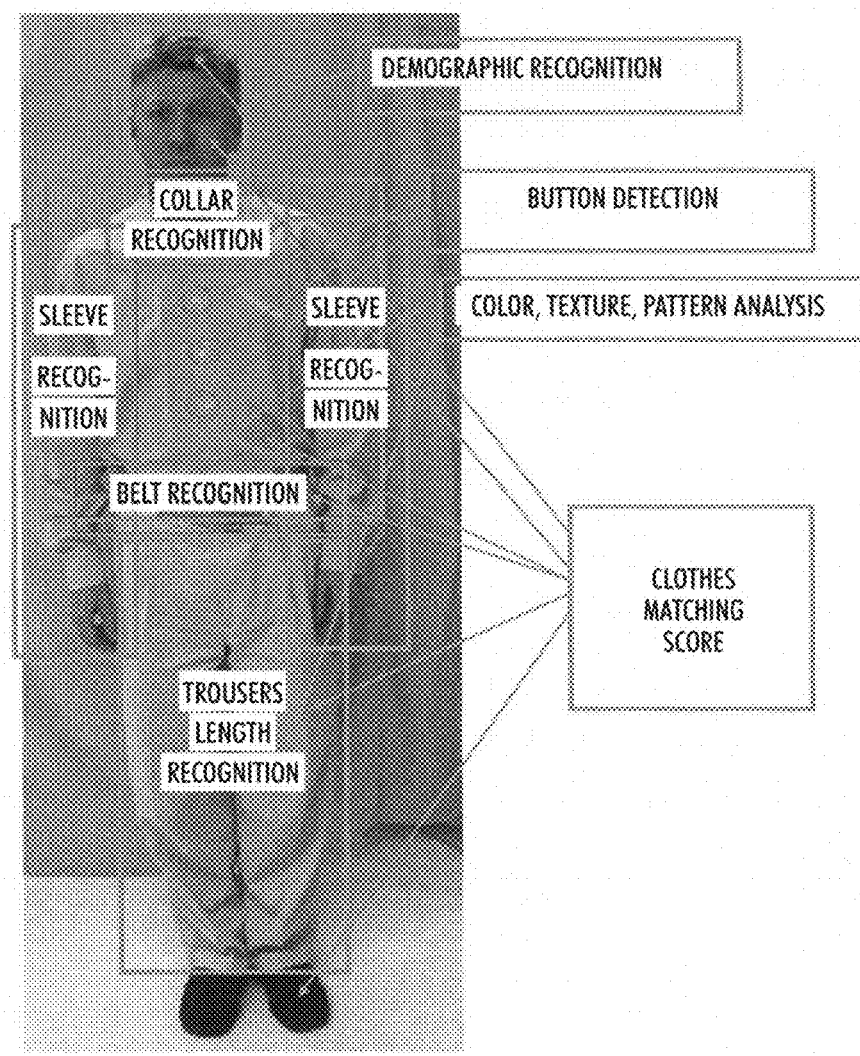
FIG. 1 illustrates exemplary modules of a clothes-recognition system in accordance with one embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a visual system that facilitates intelligent fashion exploration based on clothes recognition. The system can display images of others wearing outfits of both similar and different styles to the one being tried on by the person. The display can help the person determine whether the style she is trying on is close to a presentation of self that she would want to project. More specifically, embodiments of the present invention facilitate real-time clothes detection and recognition.

Clothes recognition can be employed as a contextual cue for the purpose of human identification and face recognition. In embodiments of the present invention, a system is provided to recognize the clothing items and match them to images of other clothes. More specifically, the clothes-recognition system in embodiments of the present invention find matches to clothes from images captured by video as the shopper interacts with the system.

Generally, clothes can be matched based on global color and texture features, which are believed to be two important factors in an individual shopper's fashion taste. The present system uses not only these two features for similar and dissimilar fashion styles retrieval, but also a number of additional matching criteria for identifying a particular style of clothing, such as the presence and shape of collar (e.g., buttoned-down shirt versus crew neck), presence and number of buttons (e.g., polo shirt versus dress shirt), presence and complexity of patterns (e.g., thin plaid versus wide stripes), sleeve length, and trouser length.

Ideally, a complete clothes recognition system addresses several computer vision and machine learning problems. For example, the system identifies the salient features to the human and machine perception (e.g., color, collar, sleeve, button, etc.) for clothes style definition, how to select and combine these features for clothes recognition, what is the contextual information affecting the person's tastes, and how to integrate this information for better clothes retrieval. Embodiments of the present invention are not only useful for the recognition of clothes and fashion, but also valuable for the solution of related object recognition problems.

Embodiments of the present invention perform color, texture, and pattern analysis for clothes matching. The system also employs machine learning to classify the clothes into different categories. In some embodiments, the system only matches clothes that belong to the same category (e.g., all T-shirts).

FIG. 1 illustrates exemplary modules of a clothes-recognition system in accordance with one embodiment of the present invention. The system can perform a number of image-processing and pattern-recognition functions as part of the color, texture, and pattern analysis. These functions include collar recognition, sleeve recognition, trousers-length recognition, belt recognition, button detection, and demographic recognition.

Clothes Detection

In order to recognize the clothes, such as shirts, which the customer is wearing, the system first detects the location of the clothes within an image. When the system is given an image of a person wearing clothes, the detection of shirts is equivalent to the detection of the torso part of the human body. In the fitting room of a clothing retail store, shoppers, wearing clothes, typically stand upright in front of a mirror. The present clothes-detection system captures a relatively large torso region from the person's image.

In one embodiment, the clothes-detection system can operate in real time by employing a clothes-detection algorithm with light computational cost. Since the system can extract the human body region by motion tracking, the approximate torso portion can be efficiently detected by segmenting within a bounding box of the whole body.

Figure 2A:
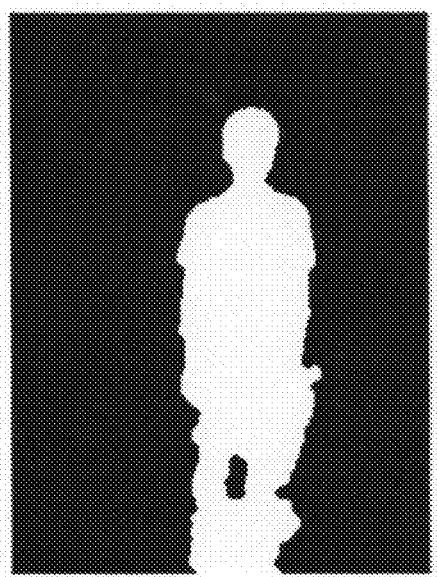
FIG. 2A illustrates an exemplary cleaned foreground map in accordance with one embodiment of the present invention.
Figure 2B:
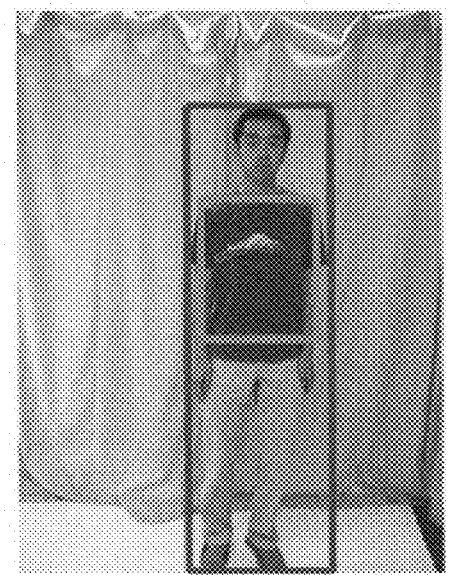
FIG. 2B illustrates the application of a body bounding box and a torso bounding box to a person's image in accordance with one embodiment of the present invention.

In one embodiment, the system separates the background from the foreground so that a contour of the person's body can be identified. FIG. 2A illustrates an exemplary cleaned foreground map in accordance with one embodiment of the present invention. Given the cleaned foreground map, the system then applies a bounding box, which is represented by the blue box in FIG. 2B, to the person's body. The system then extracts the approximate torso part, which is represented by the green box in FIG. 2B, using heuristic ratios within the bounding box. This clothes-detection mechanism is sufficiently robust to different clothes localizations and the recognition results have proven satisfactory using this segmentation method.

Clothes Matching Based on Color and Texture

In one embodiment, the system uses color information for clothes matching. During operation, the system computes a color histogram in Red, Green, and Blue (RGB) channels from the segmented torso part. The system then compares the histogram with the histograms of other clothing items. The system further measures the similarity between two pieces of clothes by applying the $\chi^2$ test between two histograms. The details of $\chi^2$ tests can be found in Chernoff H, Lehmann E. L., "The use of maximum likelihood estimates in $\chi 2$ tests for goodness-of-fit," *The Annals of Mathematical Statistics* 1954; 25:579-586, which is incorporated by reference herein.

Figure 3A:
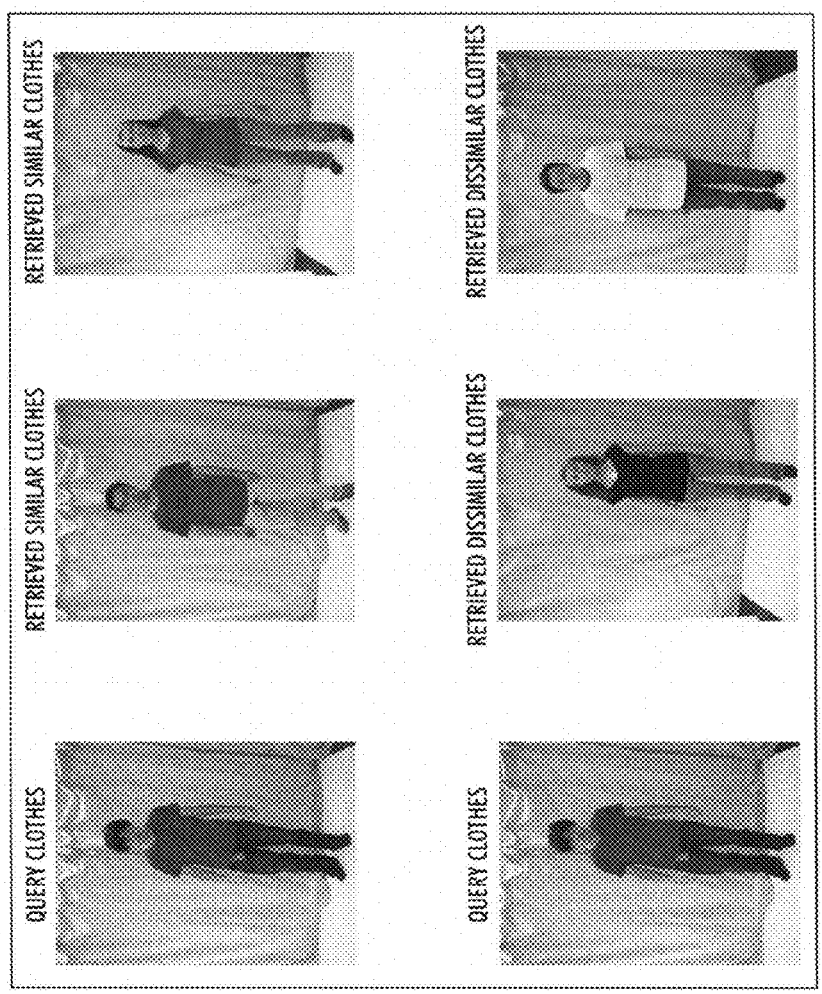
FIG. 3A illustrates a set of exemplary clothes-retrieval results based on color matching in accordance with one embodiment of the present invention.

The system then retrieves the most similar and/or the most dissimilar clothes from the same category and display their images to the person for comparison. FIG. 3A illustrates a set of exemplary clothes-retrieval results based on color matching in accordance with one embodiment of the present invention.

Besides color, clothing texture is also identified as a significant cue for clothes recognition due to its connection with fabric and pattern. In order to explore color and texture information simultaneously for clothes recognition, the system employs an "Eigen-Patch" approach.

In the Eigen-Patch approach, instead of building histograms on the RGB values on each pixel, the system crops overlapping small image patches within the torso region and represents each patch by a multi-dimensional vector. In one embodiment, all the patches from all the clothes are stacked. The system then performs a Principal Component Analysis (PCA) to the feature stack to reduce the feature dimension and extract the most significant features from the clothes. PCA is a mathematical tool for statistical pattern recognition and its details are described in Fukunaga, K, "Introduction to Statistical Pattern Recognition," Elsevier 1990, which is incorporated by reference herein.

Figure 3B:
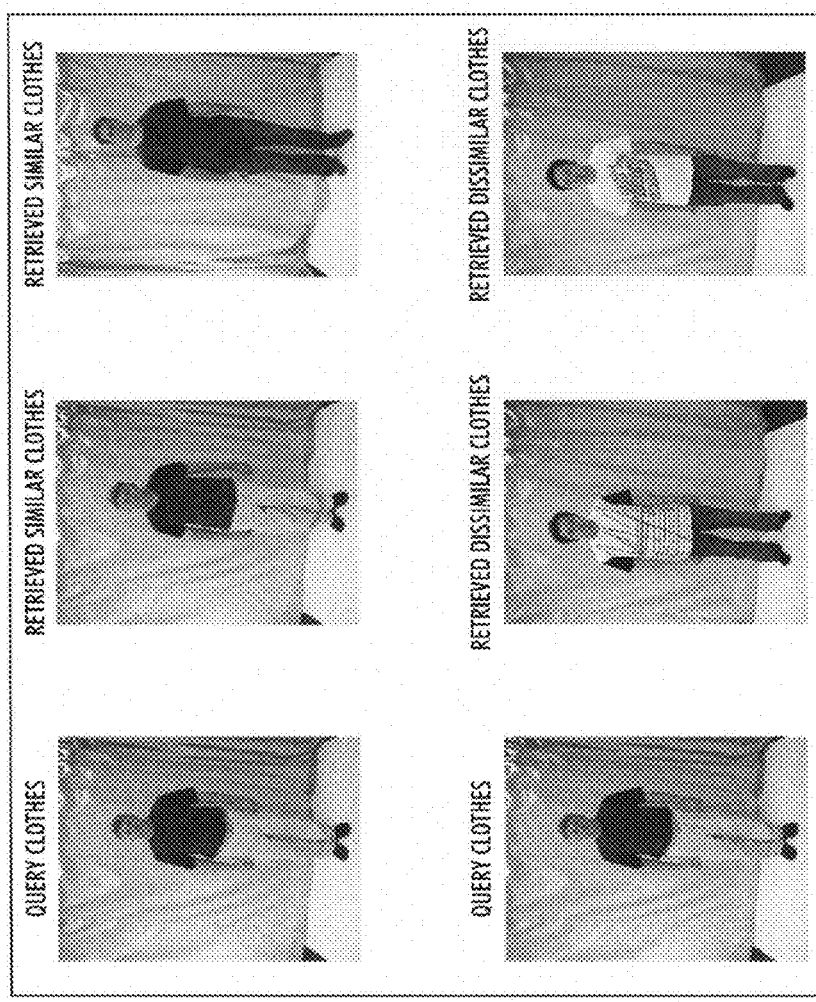
FIG. 3B illustrates a set of exemplary clothes-retrieval results based on eigen-patch analysis in accordance with one embodiment of the present invention.

The system then projects the small patches to the first k principal components (referred to as "eigen patches") which are obtained from the PCA. Next, the system builds histograms on the projected feature vectors. In one embodiment, the system builds n histogram bins in each dimension by evenly dividing the interval between the maximal and minimal values observed in the dataset along this dimension. For a previously unseen clothing item, the system applies the same process to the torso patches to compute the corresponding eigen-patch histogram. The system then compares the histogram with all the histograms of other clothing items based on $\chi 2$ test to find similar and dissimilar clothes. FIG. 3B illustrates a set of exemplary clothes-retrieval results based on eigen-patch analysis in accordance with one embodiment of the present invention.

Collar Recognition

In one embodiment, the system uses a supervised learning algorithm to classify the clothes into different categories. In general, a collar on a shirt is an important cue to discriminate between formal shirts (e.g., dress shirts and polo shirts) and casual shirts (e.g., t-shirts and sweaters). Although it is very easy for human eyes to determine the existence of collar, recognizing it automatically from a camera is not a trivial problem.

Typically, collars have more salient corners than non-collar clothes. Therefore, the system combines low-level interest point detector with simple classifier to extract collar information from the camera images. The first step is to detect the corner points from the RGB channels of clothes images using Harris corner detector, the details of which are described in Harris, C. and Stephens, M., "A combined corner and edge detector," *Proceedings of the 4th Alvey Vision Conference*: pages 147-151. 1988, which is incorporated by reference herein.

The Harris detector uses the second moment matrix for feature detection. This matrix describes the gradient distribution in a local neighborhood of a point x:

$$M = \mu(x, \sigma_I, \sigma_D)$$

$$= \begin{bmatrix} \mu_{11} & \mu_{12} \\ \mu_{21} & \mu_{22} \end{bmatrix}$$

$$= \sigma_D^2 g(\sigma_I) \cdot \begin{bmatrix} I_x^2(x, \sigma_D) & I_x I_y(x, \sigma_D) \\ I_x I_y(x, \sigma_D) & I_y^2(x, \sigma_D) \end{bmatrix}$$

The local image derivatives along x and y axis, $I_x$ and $I_y$, are computed with Gaussian kernels of scale $\sigma_D$. The derivatives are then averaged in the neighborhood of the point by smoothing with a Gaussian window of scale $\sigma_I$ (in one embodiment, $\sigma_D = \sigma_I = 6$). This matrix represents two principal signal changes in a neighborhood of the point. This property enables the extraction of corner points—the points where both curvatures are significant, that is, the signal change is significant in orthogonal directions. The Harris measure at point x is given by:

$$c = (\mu_{11}^2 \cdot \mu_{22}^2 - \mu_{12}^2) / (\mu_{11}^2 + \mu_{22}^2)$$

Figure 4A:
FIG. 4A illustrates a set of exemplary Harris corner points detected in the Red channel on non-collar clothes with $t_c=500$ (left) and $t_c=2000$ (right) in accordance with one embodiment of the present invention.

The Harris measure is an indicator of the "strength of cornerness" at point x, that is, how distinctive the corner is. After the system computes the Harris measure at each pixel within the neck region, the peak points are detected using non-maximal suppression with a radius r (in one embodiment, r=9). If the Harris measure at a peak point x is higher than a threshold $t_c$, x is identified as a Harris corner point. The Harris corner detector is applied to each of the RGB channels. FIG. 4A illustrates a set of exemplary Harris corner points detected in the Red channel on non-collar clothes with $t_c$=500 (left) and $t_c$=2000 (right) in accordance with one embodiment of the present invention. Similarly, FIG. 4B illustrates a set of exemplary Harris corner points detected in the Red channel on clothes with collar with $t_c$=500 (left) and $t_c$=2000 (right) in accordance with one embodiment of the present invention.

Figure 4B:
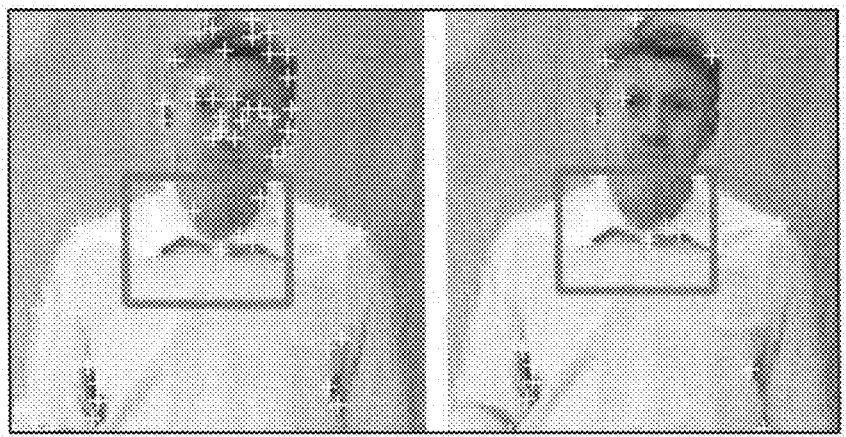
FIG. 4B illustrates a set of exemplary Harris corner points detected in the Red channel on clothes with collar with $t_c=500$ (left) and $t_c=2000$ (right) in accordance with one embodiment of the present invention.

Similar to clothes detection, the neck part of the human body can be detected by segmenting within the bounding box of the human body (the green boxes shown in FIGS. 4A and 4B). Then, based on our assumption, the system can determine the presence of collar based on the number of Harris corner points detected from all the channels within the neck part.

Suppose that N clothing items $\{C_1, C_2, \ldots, C_N\}$ are described by their features: the number of Harris corners detected in the neck parts: $X = \{x_1, x_2, \ldots, x_N\}$. The system the assigns different labels to the clothing items that have (indicated by a value of +1) or do not have (indicated by a value of -1) collars:
$Y = \{y_1, y_2, \ldots, y_N\}$, $y_n \in \{+1, -1\}$. Collar recognition is then formulated as a supervised learning problem. In one embodiment, the system employs a Decision Stump classifier to solve this problem. A Decision Stump is a machine learning model consisting of a Decision Tree with only a single branch. A Decision Stump d classifies the examples that has feature values smaller than or equal to its threshold $t_d$ to its right branch (-1), and classifies the others to its left branch (+1). The learning of the Decision Stump involves sorting the feature values and then searching for the threshold t* on the feature values that maximize the drop in impurity. The learned decision stump classifier can be applied to new clothing items efficiently by performing a threshold test. More details on Decision Stump can be found in Opelt, A., Pinz, A., Fussenegger, M., and Auer, P., "Generic object recognition with boosting," *PAMI*, vol. 28, No. 3, pp. 416-431, 2006 and Duda, R. O., Hart, P. E., and Stork, D. G., "Pattern classification," 2nd Ed., John Wiley & Sons, 2001, both of which are incorporated by reference herein.

Sleeve Recognition

Sleeve length is another important factor for clothes recognition. It is also mentioned in the Wikipedia definition for "shirt" as a significant cue to discriminate between polo-shirts, T-shirts, sweat shirts (short-sleeved or none-sleeve) from dress shirts or jackets (long-sleeved). In order to recognize these two categories, it is assumed that long-sleeved clothes usually expose less skin area on arms than short-sleeved or none-sleeved clothes do. In one embodiment, the sleeve-recognition is divided into two sub-problems: skin detection and sleeve classification.

Figure 5A:
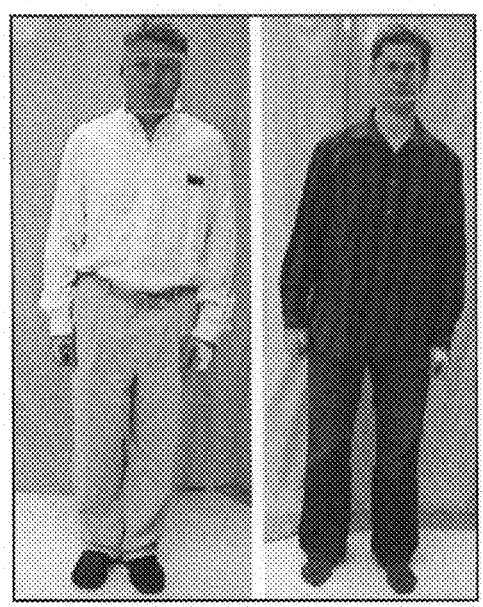
FIG. 5A illustrates an exemplary face detection and arm-skin detection on long-sleeved clothes in accordance with one embodiment of the present invention.
Figure 5B:
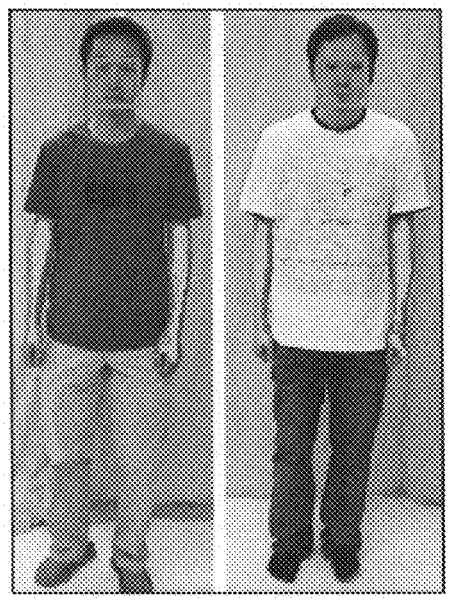
FIG. 5B illustrates an exemplary face detection and arm-skin detection on short-sleeved clothes in accordance with one embodiment of the present invention.

Generic skin detection is a difficult problem due to the difference in skin types and lighting conditions. In one embodiment, the system takes advantage of the fact that the skin tone of one's face is usually similar to the skin tone of her arms. Therefore, the system first applies an efficient face detector to detect the location of the person's face from his frontal view image, as shown in the green boxes in FIGS. 5A and 5B. For details of one exemplary face detector, see Kienzle, W., Bakir, G., Franz, M., and Scholkopf, B., "Face detection—efficient and rank deficient," NIPS, pp. 673-680, 2005, which is incorporated by reference herein.

The system then clusters the RGB values of the extracted facial pixels using Gaussian Mixture Modeling. (See Duda, R. O., Hart, P. E., and Stork, D. G., "Pattern classification," 2nd Ed., John Wiley & Sons, 2001.) In one embodiment, the number of clusters is empirically set to 2. Hence, it is expected that one of the clusters represents the customer's skin tone.

Next, for every pixel x in the rough arm area (right and left side of the upper body), a small patch p(x) of size 5×5 centered at x is extracted. x is identified as a skin pixel only if the following two conditions are true:

1. Patch p(x) is coherent in color. That is, the variance of RGB values within p(x) is smaller than a threshold. This is to prevent false detections from skin-like colors in sleeves.

2. The minimal Mahalanobis distance from the mean of the RGB values within p(x) to the two face pixel clusters is smaller than threshold $t_S$. The skin detection results using $t_S$=5 is shown in light blue areas in FIGS. 5A and 5B.

After skin detection, the sleeve length is approximated by the number of skin pixels detected in the arms. A Decision Stump is learned on these features to recognize the sleeve lengths.

Evaluation of Collar-Recognition Mechanism

Figure 6:
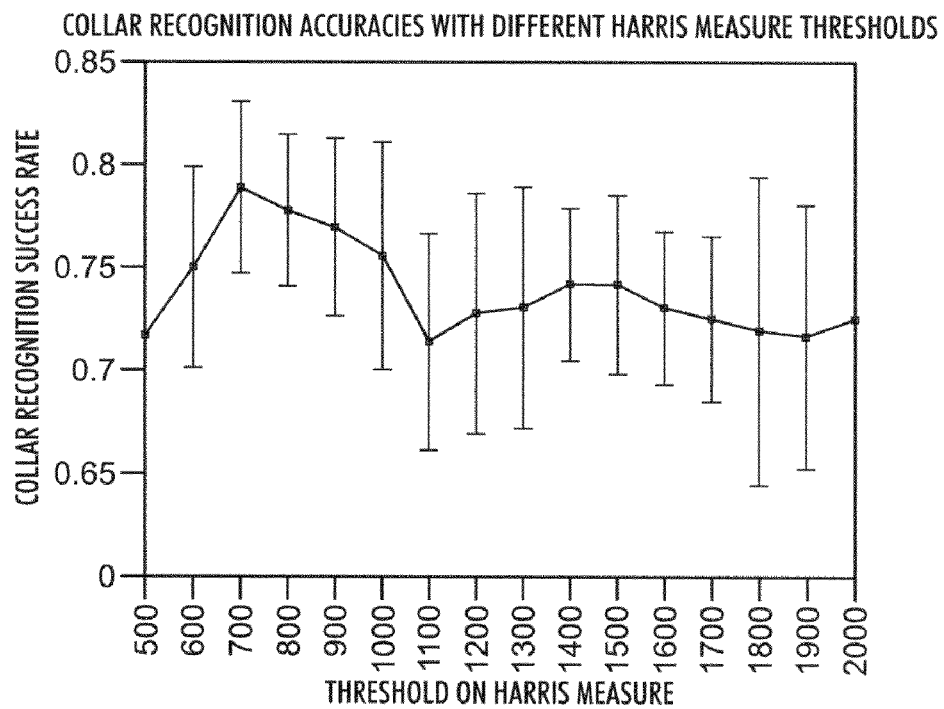
FIG. 6 illustrates the performance of the collar-recognition mechanism in accordance with one embodiment of the present invention.

FIG. 6 illustrates the performance of the collar-recognition mechanism in accordance with one embodiment of the present invention. The collar recognition mechanism is evaluated with a simulated social fashion dataset which contains 51 shirts without collar (−1) and 24 shirts with collars (+1). The experiment is performed under different settings of the Harris measurement threshold, $t_c$, to test its effect on the performance. For each $t_c$ value, half of the shirts from each class are randomly selected as training examples, and the other shirts are used for testing. There is no overlap between training and testing set. The experiment is repeated 10 times with random reselections, and the average recognition accuracies (the red curve) along with the standard deviations (the blue vertical lines) with different values of $t_c$ is illustrated in FIG. 7.

It can be observed that the recognition accuracy is close to 80%, and the variance of the accuracy is not small, which is reasonable due to the small size of the dataset. It is expected that the performance of collar recognition can improve with larger-scale datasets, and even better when combined with other recognition mechanisms (e.g., sleeve and button recognition).

Evaluation of Sleeve-Recognition Mechanism

Figure 7:
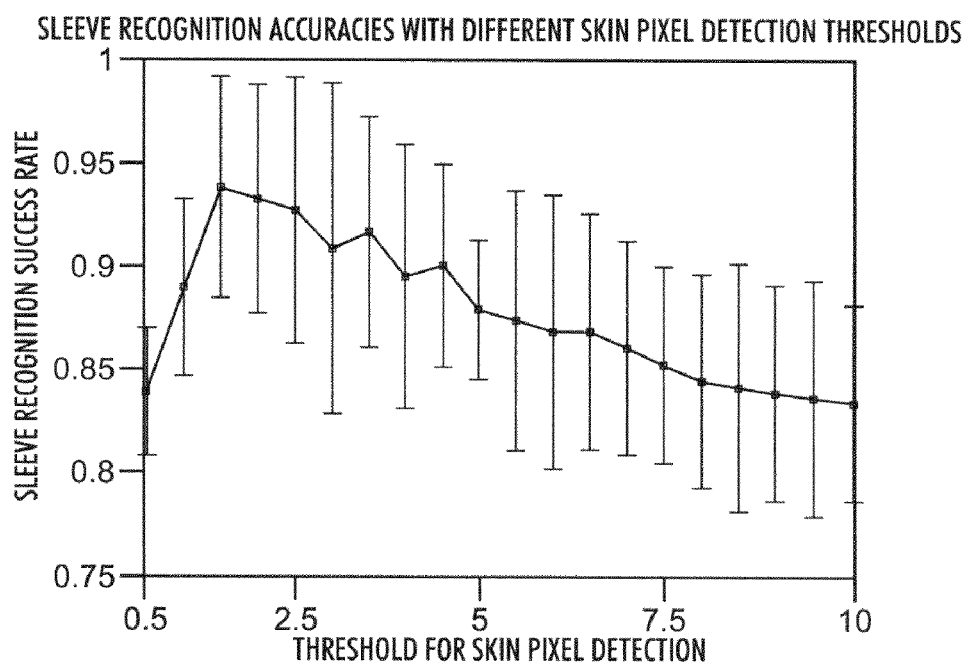
FIG. 7 illustrates the performance of the sleeve recognition mechanism in accordance with one embodiment of the present invention.

FIG. 7 illustrates the performance of the sleeve recognition mechanism in accordance with one embodiment of the present invention. Under the same experiment setting as the collar-recognition evaluation, the sleeve-recognition mechanism is tested under different settings of the threshold $t_S$. As shown in FIG. 7, the sleeve-recognition mechanism can achieve approximately 93% recognition accuracy when a small threshold is used.

System Operation

Figure 8:
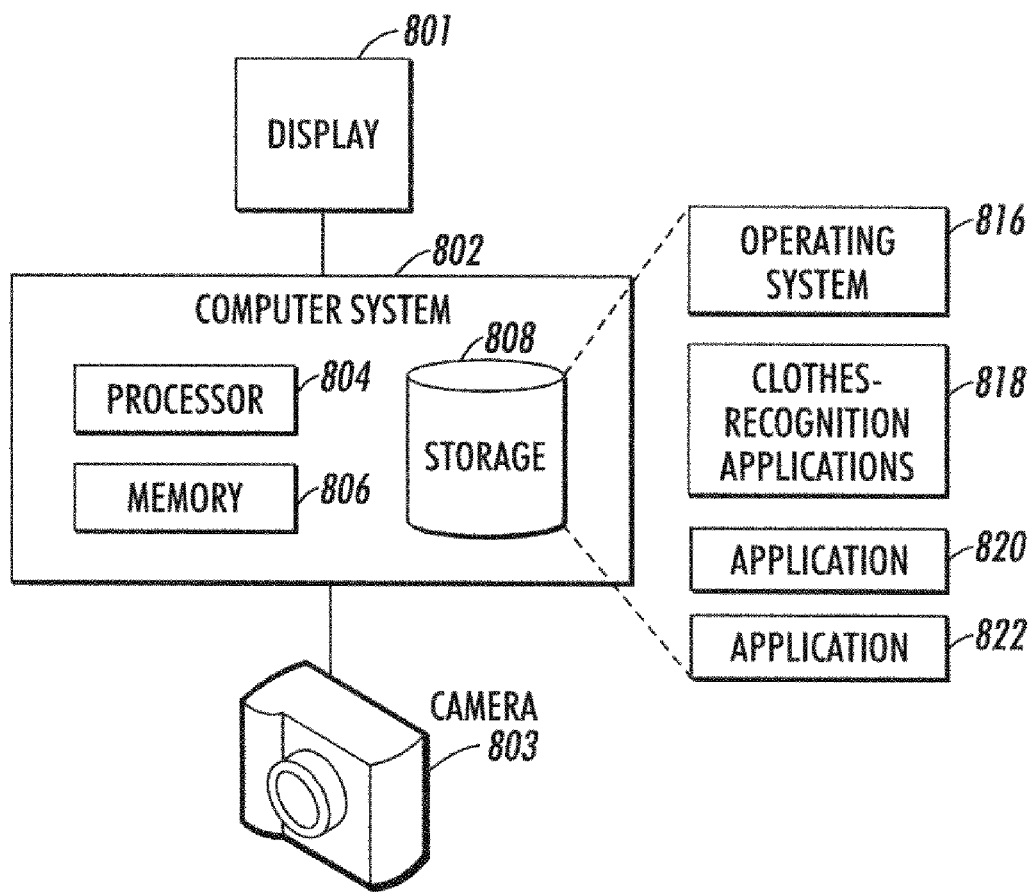
FIG. 8 illustrates an exemplary computer system that facilitates a clothes-recognition system in accordance with one embodiment of the present invention.

FIG. 8 illustrates an exemplary computer system that facilitates a clothes-recognition system in accordance with one embodiment of the present invention. Computer system 802 includes a processor 804, a memory 806, and a storage device 808. Computer system 802 is coupled to a display 801 and a camera 803.

Storage device 808 stores code for an operating system 816, as well as applications 820 and 822. Also included in storage device 808 are clothes-recognition applications 818. During operation, clothes-recognition applications are loaded into memory 806. When processor 804 executes the corresponding code stored in memory 806, processor 804 performs the aforementioned analysis to the images captured by camera 803 and displays the matching clothing items on display 801.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer executed method for recognizing and classifying clothes, the method comprising:
    capturing at least one image of a clothing item;
    determining a region on the captured image which corresponds to a torso and/or limbs;
    determining at least one color composition of the clothing item;
    determining at least one texture composition of the clothing item;
    determining a collar configuration of the clothing item;
    determining a sleeve configuration of the clothing item;
    classifying the clothing item into at least one category based on the determined color composition, texture composition, collar configuration, and sleeve configuration; and
    producing a result which indicates the classification.

2. The method of claim 1,
    wherein the clothing item is worn by a person; and
    wherein determining the region on the captured image which corresponds to the torso and/or limbs comprises:
        producing a clean foreground map from the image; and
        applying one or more bounding boxes to the image, wherein a respective bounding box encloses a part of the person's body.

3. The method of claim 1,
    wherein determining the color composition of the clothing item comprises generating a color histogram in a given color space; and
    wherein the method further comprises comparing the color histogram of the clothing item with a previously stored color histogram of another clothing item, thereby facilitating determination of a color match between the two clothing items.

4. The method of claim 1,
wherein the method further comprises:
cropping a set of image patches within the torso region of a number of clothing items;
representing a respective patch in a multi-dimension vector;
generating a number of eigen patches by applying a principal component analysis (PCA) to the patches corresponding to different clothing items;
wherein determining the texture composition of the clothing item comprises:
projecting a multi-dimension vector which represents a patch for the clothing item to the eigen patches; and
building a histogram of the projected vectors associated with the patches for the clothing item; and
wherein the method further comprises comparing the projected-vector histogram for the patches associated with the clothing item with those of different clothing items.

5. The method of claim 1, wherein determining the collar configuration comprises:
identifying a bounding box which substantially encloses a collar region of the clothing item;
applying Harris corner detection to the bounding box for the collar region; and
optionally applying at least one learning technique based on textural and shade features in the collar region.

6. The method of claim 1,
wherein the clothing item is worn by a person; and
wherein determining the sleeve configuration comprises:
identifying a skin tone of the person's face;
comparing the color of the pixels on the image which correspond to the person's arm; and
determining the length of the person's exposed arm based on the color comparison.

7. The method of claim 1, further comprising determining the number and/or location of buttons of the clothing item, and/or the length and distribution of the placket.

8. The method of claim 1, further comprising recognizing one or more logos on the clothing item.

9. The method of claim 1, wherein the clothing item is worn by a person and the method further comprises analyzing the person's demographic information.

10. The method of claim 9, wherein analyzing the person's demographic information comprises determining the person's hair color and complexion.

11. The method of claim 1, wherein the result further indicates a match between the clothing item and a previously stored clothing item based on their respective color, pattern, and/or other factors, thereby facilitating recommendation of similar or different clothes.

12. A system including a processor and a memory operatively coupled to the processor for recognizing and classifying clothes, the system comprising:
an image capture mechanism configured to capture at least one image of a clothing item;
a clothes-detection mechanism configured to determine a region on the captured image which corresponds a torso and/or limbs;
a color-analysis mechanism configured to determine at least one color composition of the clothing item;
a texture-analysis mechanism configured to determine at least one texture composition of the clothing item;
a collar-analysis mechanism configured to determine a collar configuration of the clothing item;
a sleeve-analysis mechanism configured to determine a sleeve configuration of the clothing item;
a classification mechanism configured to classify the clothing item into at least one category based on the determined color composition, texture composition, collar configuration, and sleeve configuration; and
an output mechanism configured to produce a result which indicates the classification.

13. The system of claim 12,
wherein the clothing item is worn by a person; and
wherein while determining the region on the captured image which corresponds to the person's torso and/or limbs, the clothes-detection mechanism is configured to:
produce a clean foreground map from the image; and
apply one or more bounding boxes to the image, wherein a respective bounding box encloses a part of the person's body.

14. The system of claim 12,
wherein while determining the color composition of the clothing item, the color-analysis mechanism is configured to generate a color histogram in a given color space; and
wherein the system further comprises a comparison mechanism configured to compare the color histogram of the clothing item with a previously stored color histogram of another clothing item, thereby facilitating determination of a color match between the two clothing items.

15. The system of claim 12,
wherein the system further comprises:
a cropping mechanism configured to crop a set of image patches within the torso region of a number of clothing items;
a patch-processing mechanism configured to represent a respective patch in a multi-dimension vector;
a principal component analysis (PCA) mechanism configured to generate a number of eigen patches by applying a CPA to the patches corresponding to different clothing items;
wherein while determining the texture composition of the clothing item, the texture analysis mechanism is configured to:
project a multi-dimension vector which represents a patch for the clothing item to the eigen patches; and
build a histogram of the projected vectors associated with the patches for the clothing item; and
wherein the system further comprises a comparison mechanism configured to compare the projected-vector histogram for the patches associated with the clothing item with those of different clothing items.

16. The system of claim 12, wherein while determining the collar configuration, the collar-analysis mechanism is configured to:
identify a bounding box which substantially encloses a collar region of the clothing item;
apply Harris corner detection to the hounding box for the collar region; and
optionally applying at least one learning technique based o the textural and shade features in the collar region.

17. The system of claim 12,
wherein the clothing item is worn by a person; and
wherein while determining the sleeve configuration, the sleeve-analysis mechanism is configured to:
identify a skin tone of the person's face;
compare the color of the pixels on the image which correspond to the person's arm; and determine the length of the person's exposed arm based on the color comparison.

18. The system of claim 12, further comprising a button/placket-analysis mechanism configured to determine the number and/or location of buttons and/or the length and distribution of placket of the clothing item.

19. The system of claim 12, further comprising a logo-recognition mechanism configured to recognize one or more logos on the clothing item.

20. The system of claim 12 wherein the clothing item is worn by a person and the apparatus further comprises a demographic-information-analysis mechanism configured to analyze the person's demographic information.

21. The system of claim 20, wherein while analyzing the person's demographic information, the demographic-information-analysis mechanism is further configured to determine the person's hair color and complexion.

22. The apparatus of claim 12, wherein the result further indicates a match between the clothing item and a previously stored clothing item based on their respective color, pattern, and/or other factors, thereby facilitating recommendation of similar or different clothes.

23. A non-transitory computer readable medium storing instructions which when executed by a computer cause the computer to perform a method for recognizing and classifying clothes, the method comprising:
- capturing at least one image a clothing item;
- determining a region on the captured image which corresponds to a torso and/or limbs;
- determining at least one color composition of the clothing item;
- determining at least one texture composition of the clothing item;
- determining a collar configuration of the clothing item;
- determining a sleeve configuration of the clothing item;
- classifying the clothing item into at least one category based on the determined color composition, texture composition, collar configuration, and sleeve configuration; and
- producing an result which indicates the classification.

* * * * *